United States Patent [19]

Pogorelov et al.

[11] 4,098,080
[45] Jul. 4, 1978

[54] HYDRAULIC TORQUE CONVERTER

[76] Inventors: Valery Viktorovich Pogorelov, Uralskaya ulitsa, 5, kv. 138; Sergei Mikhailovich Trusov, Festivalnaya ulitsa, 22, korpus 5, kv. 546; Nikolai Petrovich Kolbin, ulitsa Ivana Susanina, 6, korpus 1, kv. 161, all of Moscow; Lev Nikolaevich Chistyakov, ulitsa Dzerzhinskogo, 59, kv. 155, Yaroslavl, all of U.S.S.R.

[21] Appl. No.: 775,931

[22] Filed: Mar. 9, 1977

[51] Int. Cl.² .......................................... F16D 33/00
[52] U.S. Cl. .................................... 60/361; 60/364; 60/367; 29/156.8 FC; 416/180
[58] Field of Search ............... 60/341, 345, 361, 362, 60/364, 367; 29/156.8 FC; 416/180, 194

[56] References Cited

U.S. PATENT DOCUMENTS

| 3,503,209 | 3/1970 | Loffelholz | 60/361 |
| 3,545,883 | 12/1970 | Iijima | 60/367 X |
| 3,797,243 | 3/1974 | Trusov | 60/361 |

*Primary Examiner*—Edgar W. Geoghegan
*Attorney, Agent, or Firm*—Haseltine, Lake & Waters

[57] ABSTRACT

A hydraulic torque converter comprises vaned members, viz. an impeller, a turbine, and a stator designed to take up reactive torque. Each vaned member consists of a casing and an inner ring to which are fixed vanes which form a closed fluid circuit enclosed on the outside by the vaned-member casings which jointly form an outer toroidal surface, the inside enclosure being made up of the inner rings which jointly form an inner toroidal surface. The vanes of at least one of the vaned members are secured to the casing and inner ring by means of tongues fitted into slots provided in said casing and inner ring. Said vanes have a hydrodynamic profile of varying thickness and the body of each vane contains a plate whose projecting elements form said tongues.

The torque converter constituting the present invention, when used in a passenger car, increases the efficiency of the transmission by 1-3 percent.

4 Claims, 9 Drawing Figures

HYDRAULIC TORQUE CONVERTER

BACKGROUND OF THE INVENTION

The present invention relates to hydraulic transmissions, more particularly, to hydraulic torque converters.

The torque converter constituting the present invention can be used with particular advantage in motor vehicle transmissions. When interposed in the power path aft of the engine, the torque converter automatically provides an infinitely-variable change of torque on its output shaft, which is connected to the transmission shaft, and safeguards the components of the engine and transmission from dynamic loads arising in going over rough terrain and in making gearchange, from engine torsional oscillations, and from other detrimental conditions. The torque converter is sufficiently simple to manufacture and reliable in operation.

The torque converters known in the art are constructed in the form of a vaned machine which usually comprises an impeller connected to the engine shaft, a turbine connected to the torque converter output shaft, and a stator designed to take up the reactive torque arising in the process of changing the engine torque and connected to a stationary shaft through a freewheeling clutch, the three abovesaid vaned members being arranged so as to form the working circuit of the torque converter.

Each of the vaned members consists of a casing, an inner ring, and vanes fitted therebetween.

All the vaned members are enclosed in the torque converter casing which is formed by the casing of one of the vaned members, usually the impeller, and associated parts. With this construction, the torque converter casing is rotatable.

When the impeller rotates, the working fluid contained in the torque converter is caused to flow through the vanes of the torque converter members and, by interaction therewith, rotates through 360°, circulating within the closed space. The flow of the working fluid is enclosed on the outside by the casings of the vaned members which jointly form the outer toroidal surface, whereas the inside enclosure is made up of the inner rings which jointly form the inner toroidal surface.

The most widely accepted type of torque converter employs a centrifugal impeller whose outlet is located at the maximum circulation radius, a centripetal turbine whose inlet is located at the maximum circulation radius, and a stator located at the minimum circulation radius.

The torque converters of this type are known to be widely used in the transmissions of automobiles and other vehicles. They have a compact construction and light weight and automatically provide change of torque over a wide range of speed ratios.

Concerning the torque converter vanes, it will be noted that the endeavour to cut down manufacturing costs, particularly in the automobile industry with its large-scale production, affects the hydrodynamic perfection of the vane profile. The deviation from the perfect vane profile adds to the power losses due to the vortex flow about the vanes. The resultant falling-off in the torque converter efficiency leads to decrease of the transmitted power and, consequently, adversely affects the performance of the vehicle involved.

Widely known in the prior art is a torque converter the casing of which accommodates a centrifugal impeller, a centripetal turbine and a stator, said three vaned members being aluminium alloy castings. The vaned members form a closed fluid circuit, their vanes being located between the vaned-member casing forming part of the outer toroidal surface and the inner ring forming part of the inner toroidal surface. The vanes, casing and inner ring are cast integrally. The vanes have varying sectional thickness and the vaned members feature high strength and operating reliability.

The torque converters of this construction are usually employed in the hydraulic transmissions of cargo trucks and other high-power vehicles.

However, the present-day sand-core technique used for casting torque converter vanes fails to provide the necessary accuracy of the vane profile and high finish of the surfaces in contact with the working fluid.

The typical drawbacks to cast vaned members are instability of the shape of the vane leading portion, excessive thickness of the trailing edge, roughness and other defects of the vane surfaces.

These drawbacks increase fluid frictional losses, vortex phenomenon and edge losses.

In consequence, the torque converter with cast vaned members has smaller efficiency and output/input ratio than the values that can be theoretically obtained with vanes having hydrodynamically perfect profiles.

The intricate form of the vane profile prevents the use of advanced precision casting methods such as high-pressure casting, etc. On the other hand, the correction of the casting imperfections by the file-bench technique increases the manufacturing cost. Therefore, the torque converter characteristics such as the efficiency and the torque ratio decrease with increasing production and, consequently, the performance of the vehicles involved becomes worse.

Also known in the art is a torque converter whose casing accommodates an impeller, a turbine and a stator arranged so that their vanes form a closed fluid circuit. The turbine vanes are located between the turbine casing which forms part of the outer toroidal surface and the inner ring which forms part of the inner toroidal surface. These vanes have varying sectional thickness and are connected to the impeller casing and inner ring by means of projections cast in the form of pins on the impeller casing and adapted to pass through a hole provided in each of the vanes and fit into slots provided in the inner ring. The fixing of the vanes is effected by plastic deformation of the pin ends projecting from the inner ring slots. Here, vanes with varying sectional thickness can be manufactured by the use of advanced casting technique which provides the necessary accuracy of the vane shape and high quality of the vane surface.

However, this construction suffers from the disadvantage that, in order to ensure the required strength and rigidity of the fixing pins, the casing of the vaned member has to be made of a high-strength material, for example, steel. This entails increase in the weight and in the moment of inertia of the vaned member, with consequent worsening of the vehicle accelerating properties.

Furthermore, the vanes have through holes for the fitment of the fixing pins and, therefore, their thickness is materially larger than in the case of the hydrodynamically perfect profile. Consequently, the flow passages between the vanes are substantially narrowed with resultant loss of power and decrease in the torque converter efficiency.

Also known and widely accepted is a torque converter whose casing accommodates a centrifugal impeller, a centripetal turbine and a stator arranged in such a manner that their vanes form a closed fluid circuit. The vanes of at least one of said vaned members are located between its casing which forms the outer toroidal surface and the inner ring which forms the inner toroidal surface. The casing and the inner ring having through slots. The vanes are attached to the casing and inner ring by means of tongues fitting through the slots. With this construction, the vanes, casing and inner ring are made by the use of the highly productive technique of sheet stamping. Constant-thickness vanes integal with tongues are cut out from thin sheet steel and shaped as necessary.

The casing and the inner ring are made in the same way, the slots being cut during the stamping process.

During assembly the vane tongues are fitted into the slots in the casing and inner ring and bent down, whereby a rigid structure is formed.

Most frequently the fixing of vanes by bending tongues fitted through slots in the casing and inner ring is employed on turbines. On impellers this method of vane fixing is used to a smaller extent inasmuch as the casing of an impeller usually serves as a torque casing and has, therefore, to provide a leaktight enclosure.

Since the vaned members of this construction are simple to manufacture and assemble and feature compactness, light weight, small moment of inertia and high operating reliability, they have found wide use in torque converters employed in car applications.

The high surface finish and the small thickness of the trailing edges of the vanes made by sheet stamping provide a sufficiently high torque converter efficiency under rated conditions in which the angles of the entering flow differ insignificantly from the vane angles.

When the fluid flow enters the vane at an angle different from the vane angle, a thin profile of constant thickness is conducive to greater losses than a hydrodynamic profile of varying thickness. This leads to decrease in the torque converter efficiency at off-design conditions and also in decrease of the torque conversion ratio, particularly at small speed ratios which are equal to the ratio of the turbine speed to the impeller speed. As a result, the torque conversion properties are impaired, resulting in decreased output power and, consequently, decreased vehicle speed.

SUMMARY OF THE INVENTION

It is an object of the present invention to increase torque converter efficiency by improving, first of all, the turbine, the simplicity and reliability of the vane fixing being retained.

These and other objects are achieved in a hydraulic torque converter comprising a vaned impeller member, a vaned turbine member, and a vaned stator member designed to take up reactive torque, said vaned members being arranged so that their vanes form a closed fluid circuit enclosed on the outside by the vaned-member casings which jointly form the outer toroidal surface, whereas the inside enclosure is made up of the inner rings which jointly form the inner toroidal surface. The vanes of at least one of the vaned members are attached by means of tongues to the vaned-member casing and to the inner ring, which casing and inner ring have through slots for the fitment of said tongues. According to the invention, the vanes of said vaned member have a hydrodynamic profile of varying thickness and in the body of each vane is provided at least one plate the elements of which form said tongues.

Such a hydraulic torque converter has a high efficiency and a simple, compact and reliable construction.

The built-up construction of a vaned member, for example, the turbine with the casing and inner ring thereof made of stamped steel sheet is most effective if the vanes have a hydrodynamically perfect profile.

The stamped steel casing and inner ring have high finish of the surfaces in contact with the working fluid, which improves the flow forming conditions and is conducive to decrease of hydraulic losses.

The hydrodynamically perfect profile has a rounded leading edge, varying thickness which reaches its maximum in the middle and a thinned trailing edge. The correct choice of the profile parameters provides the minimum of hydraulic losses over a wide range of variation of the angle of the entering flow.

As a result, the efficiency and the torque ratio of the hydraulic torque converter increase with resultant increase in the transmitted power and improvement in the vehicle traction performance.

Vanes with a hydrodynamically perfect profile are made of an aluminium or magnesium alloy, or a plastic by highly productive methods of high-pressure moulding, which methods ensure high accuracy and finish of the vane surface in contact with fluid.

The thin plate provided in the vane body and having projecting elements which form fixing tongues does not interfere with producing the required vane shape and provides for secure fixing of the vane to the casing and inner ring.

For the plate to be securely fitted in the vane body, it is desirable that said plate be perforated.

Secure fixing of the vane is ensured if the plate elements form at least three tongues two of which fit into the casing slots and one into the inner ring slot.

For secure fixing of the vane tongues in the casing slots, it is advisable that the tongues be wedge-shaped and the dimension of the tongue base be greater than the dimension of the mating slot in the vaned-member casing, the edges of the slots being tapered.

The hydraulic torque converter constructed according to the present invention is simple to manufacture and assemble, has secure fixing of the vanes and features improvements in the efficiency and the conversion ratio, which increases the output power and, consequently, improves the performance of the vehicle involved.

Now the invention will be described in detail with reference to the accompanying drawings in which:

IN THE DRAWINGS

PREFERRED EMBODIMENT

Figure 1:
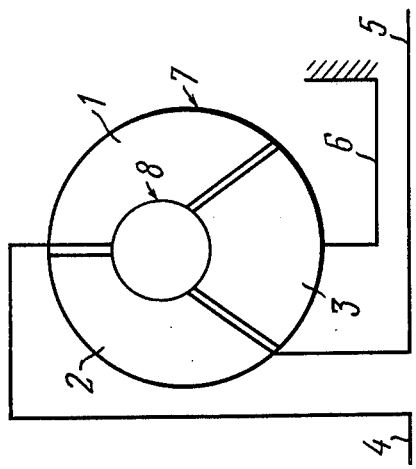
FIG. 1 is a schematic diagram of the hydraulic torque converter fluid circuit.

The hydraulic torque converter is a vaned machine. It comprises an impeller 1 (FIG. 1), a turbine 2 and a stator 3.

The impeller 1 is connected to the engine (not shown) through an input shaft 4. The turbine 2 is connected to an output shaft 5. The stator 3 is connected to a stationary shaft 6 by means of a free wheeling clutch.

The vanes of the impeller 1, turbine 2 and stator 3 form a closed working fluid circuit enclosed on the outside by a toroidal surface 7 and on the inside by a toroidal surface 8.

The impeller 1 (FIG. 2) is of built-up construction. It includes a casing 9, an inner ring 10, and vanes 11 located therebetween and fixed thereto by means of tongues 12 fitted into slots 13 and 13a which are provided in the casing 9 and in the inner ring 10 respectively. On the outside of the casing 9 the slots 13 are closed by a shield 14.

The casing 9 of the impeller 1 forms, in conjunction with a pump cover 15 and a hub 16, a hydraulic torque converter casing 17. Said casing is rotatable and is connected by means of a plate 18 to the input shaft 4 which is essentially the engine shaft.

The turbine 2 is of built-up construction. It includes a casing 19, an inner ring 20, and vanes 21 located therebetween and secured thereto by means of tongues 22 fitted into slots 23 and 23a which are provided in the casing 19 and in the inner ring 20 respectively.

The turbine 2 is connected to the torque converter output shaft 5 by means of a hub 24.

The stator 3 includes a casing 25 vanes 26 which are cast integral with the casing 25 and inner ring 27. The stator 3 is connected to the stationary shaft 6 by means of a free-wheeling clutch 28.

Figure 3:
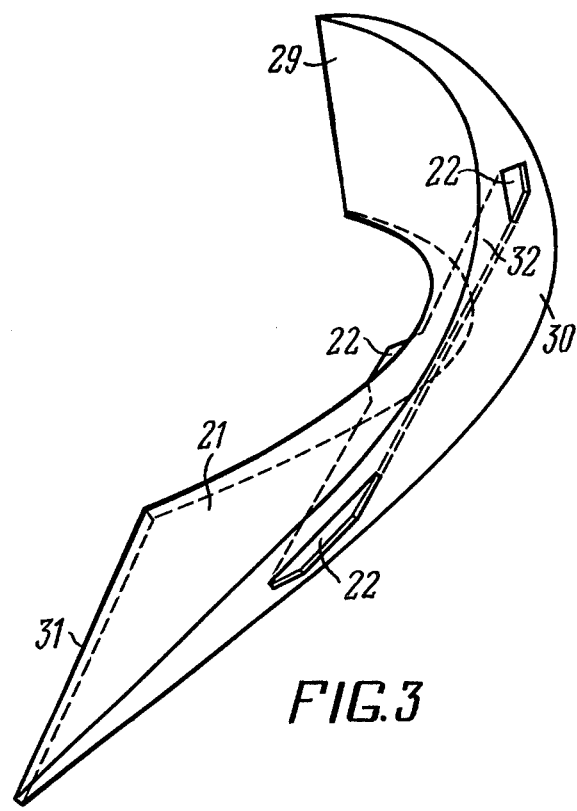
FIG. 3 is a view of a turbine vane in the direction of the arrow A in FIG. 2.

As shown with reference to the vane 21 (FIG. 3), the vanes 11 of the impeller 1, the vanes 21 of the turbine 2 and the vanes 26 of the stator 3 have a hydrodynamic profile of varying thickness, featuring a rounded leading edge 29, a thickened middle portion 30 and a thinned trailing edge 31.

Fitted in the body of the vane 21 is a plate 32 whose projecting parts form tongues 22.

The vane 21 is cast of an aluminium alloy. The plate 32 is stamped from a thin steel sheet.

Figures 4, 4A:
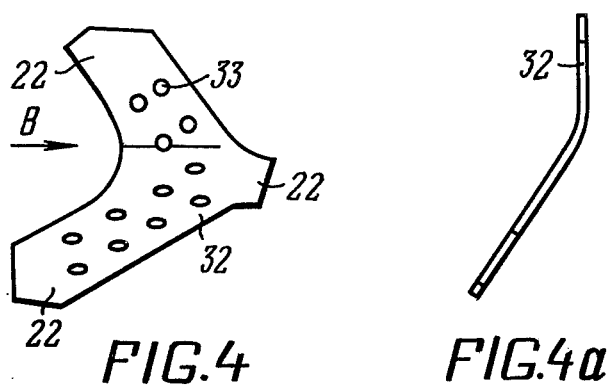
FIG. 4 shows a plate designed for fitment in the body of a turbine vane.
FIG. 4a is a view in the direction of the arrow B in FIG. 4.

The plate 32 is fitted in the vane 21 during the manufacture thereof. The provision of perforations 33 (FIG. 4) in the plate 32 promotes cohesion between the plate 32 and the plate 21.

It is appropriate to make the vanes 21 from an aluminium or magnesium alloy or a plastic by pressure moulding. This method provides light vane weight, high accuracy and high surface finish.

The thin plate 32 (FIG. 4a) located in the middle of the vane 21 (FIG. 3) does not interfere with shaping the vane 21.

When assembling the turbine 2 (FIG. 2), the tongues 22 of the vane 21 are fitted into the slots 23 and 23a provided in the casing 19 and the inner ring 20 and are bent down.

Figures 5, 5A, 5B:
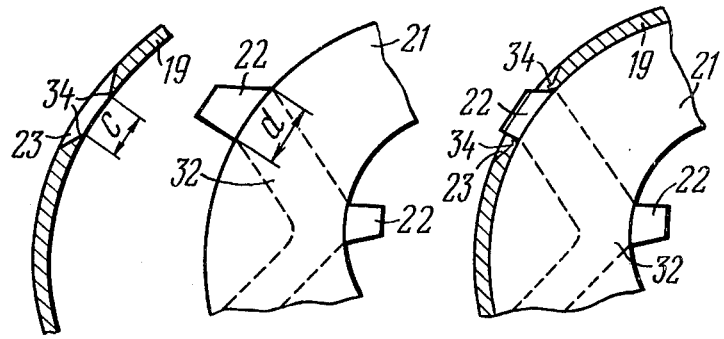
FIG. 5 shows a slot in the casing before the vane tongue is fitted therein.
FIG. 5a shows a vane tongue constructed according to the invention.
FIG. 5b shows a slot in the casing with the vane tongue fitted therein according to the invention.

It is advisable that the slots 23 (FIG. 5) in the casing 19 be made with the edges 34 tapered so that the dimension "c" of the slot be less than the dimension "d" (FIG. 5a) of the base of the tongue 22, the latter being wedge-shaped.

Plastic deformation of the tapered edges 34 (FIG. 5b) provides a close fit and secure fixing of the tongues 22 in the slots 23.

Figure 2:
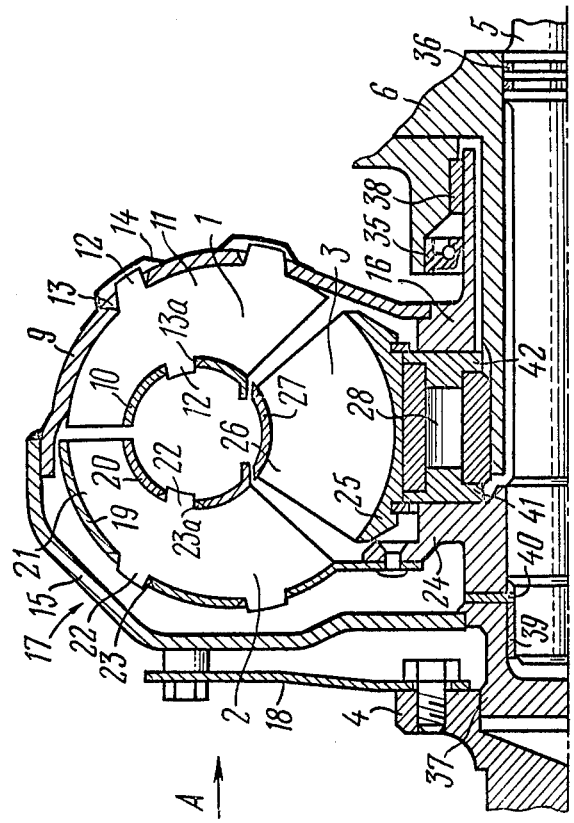
FIG. 2 is a diametric section of the hydraulic torque converter constructed according to the invention.

The other vaned members of the torque converter can be constructed in the manner of the impeller 2 (FIG. 2).

The torque converter casing 17 is leaktight. The working fluid is supplied and discharged for the purpose of heat rejection by way of passages provided in the stationary shaft 6. To prevent fluid leakage, a seal 35 is provided between the torque converter casing 17 and the stationary shaft 6, and piston-type resilient rings 36 are provided between the output shaft 5 and the stationary shaft 6.

The torque converter and the input shaft 4 are kept in alignment by provision of a centering shoulder 37. A plain bearing 38 forms a support for the torque converter casing 17.

The torque converter and the output shaft 5 are kept in alignment by a plain bearing 39.

Thrust forces on the vaned members of the torque converter are transmitted to the casing 17 through washers 40, 41 and 42. The plate 18 takes up the unbalanced resultant of these forces and transmits it to the input shaft 4.

The torque converter constructed according to the present invention operates as follows:

When the input shaft 4 (FIG. 1) rotates, the impeller 1 acts on the working fluid contained in the space between the outer toroidal surface 7 and the inner toroidal surface 8. Moving through the working circuit, the fluid enters the turbine 2 and transmits thereto the acquired energy. Therefrom the fluid flows into the stator 3 which changes the direction of the flow and transmits the reactive torque to the stationary shaft 6.

The conversion of torque occurs with the stator 3 acted upon by the reactive torque.

When the load on the turbine 2 decreases, the turbine speed increases and the direction of the flow entering the stator 3 coincides with the direction of the flow leaving the stator. Under these conditions no reactive torque acts upon the freewheeling clutch 28. As the turbine speed increases further, the clutch 28 allows the stator 3 to freewheel. In this condition there is no torque conversion, the torque on the input shaft 4 being equal to the torque on the output shaft 5, and the torque converter acts as a fluid coupling.

The efficiency of the torque converter depends on the amount of hydraulic losses in the vaned members, i.e., on the extent of the vane profile perfection.

When estimating hydraulic losses incurred in fluid flow past a vane, consideration is made of impact losses which depend upon the angle of entering flow and the form of the vane leading edge, friction losses which depend on the extent of profile perfection and the surface finish of the vane, and edge losses which depend on the thickness of the vane trailing edge.

The vaned members of the hydraulic torque converter constructed according to the present invention can have vanes with a hydrodynamically perfect profile causing a minimum of losses.

Figure 6:
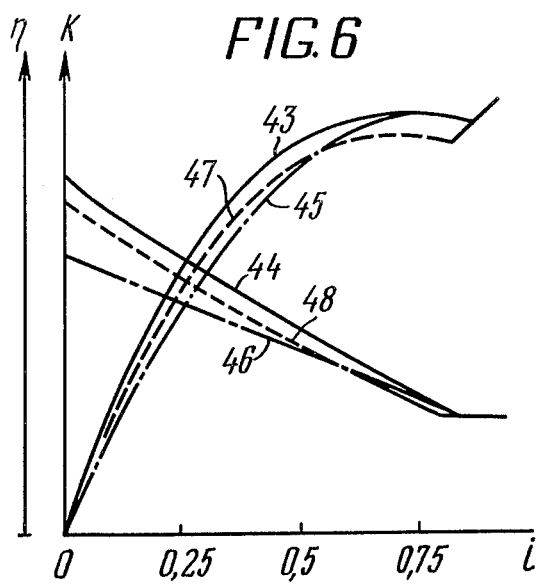
FIG. 6 is a graph showing the torque converter efficiency "η" and torque ratio "K" versus the speed ratio "i".

The characteristics of such a torque converter are represented by solid lines in FIG. 6. Here the curve 43 shows the torque converter efficiency "η" versus the speed ratio "i", the curve 44 shows the torque conversion ratio "K" versus the speed ratio "i".

The chain dotted curves in FIG. 6 show the efficiency "η" (the curve 45) and the torque conversion ratio "K" (the curve 46) versus the speed ratio "i" for a torque converter with a turbine having thin vanes with constant profile thickness.

It is seen from FIG. 6 that such a torque converter has smaller values of "η" and "K", particularly at low speed ratios "i". This is attributed to the fact that thin-vaned members incur greater impact losses as when the angle of the flow entering a thin vane differs from the vane angle, a considerable breakaway zone develops with consequent increase in power losses.

The broken lines in FIG. 6 show the efficiency "η" (the curve 47) and the torque conversion ratio "K" (the curve 48) versus the speed ratio "i" for a torque converter having a turbine cast integral with vanes of variable-thickness profile.

The values of "η" and "K" for this torque converter are smaller than those for the torque converter constituting the present invention inasmuch as in this case the vane surface roughness causes increased friction losses and the thicker trailing edge causes increased edge losses.

A hydraulic torque converter constructed according to the present invention has a 1–3 percent greater efficiency over a wide range of speed ratios as compared with a like torque converter having a turbine with thin vanes.

Many modifications and variations of the present invention are possible in light of the above teachings. It is, therefore, to be understood that within the scope of the appended claims, the invention may be practiced otherwise than as particularly described.

What is claimed is:

1. A hydraulic torque converter comprising: an impeller; a turbine; a stator designed to take reactive torque; the casing of said impeller; the inner ring of said impeller; the vanes of said impeller secured to said impeller casing and said impeller inner ring; the casing of said turbine; the inner ring of said turbine; the vanes of said turbine secured to said turbine casing and said turbine inner ring; the casing of said stator; the inner ring of said stator; the vanes of said stator secured to said stator casing and said stator inner ring; said vaned members, viz. the impeller, turbine and stator, arranged so that their vanes form a closed circuit for circulation of the flow of working fluid; said flow of working fluid enclosed on the outside by the casings of said vaned members, which casings jointly form an outer toroidal surface of said fluid conduit, the inside enclosure being made up of said inner rings which jointly form the toroidal surface of said fluid circuit; the vanes of at least one of the vaned members having a hydrodynamic profile of varying thickness; the casing of a vaned member having vanes with a hydrodynamic profile, in which casing provision is made of through slots; the inner ring of a vaned member having vanes with a hydrodynamic profile, in which inner ring provision is made of through slots; at least one plate provided in the body of each of said vanes with a hydrodynamic profile; tongues for fixing the vanes with a hydrodynamic profile to said casing and inner ring, which tongues are formed by the elements of said plate, which elements project from the body of the vane and fit into said slots.

2. A hydraulic torque converter as claimed in claim 1, wherein said plates are each provided with at least three said tongues two of which are adapted to fit into said slots in the casing and one into said slot in the inner ring.

3. A hydraulic torque converter as claimed in claim 2, wherein said tongues are essentially wedge-shaped and the dimension of the tongue base is substantially larger than the dimension of the mating slot, the edges of the slots being essentially tapered in order to facilitate their plastic deformation in fitting said tongues therein, thereby providing for secure fixing of the tongues.

4. A hydraulic torque converter as claimed in claim 1, wherein said plates provided in the bodies of the vanes are perforated.

* * * * *